United States Patent Office 2,885,174
Patented May 5, 1959

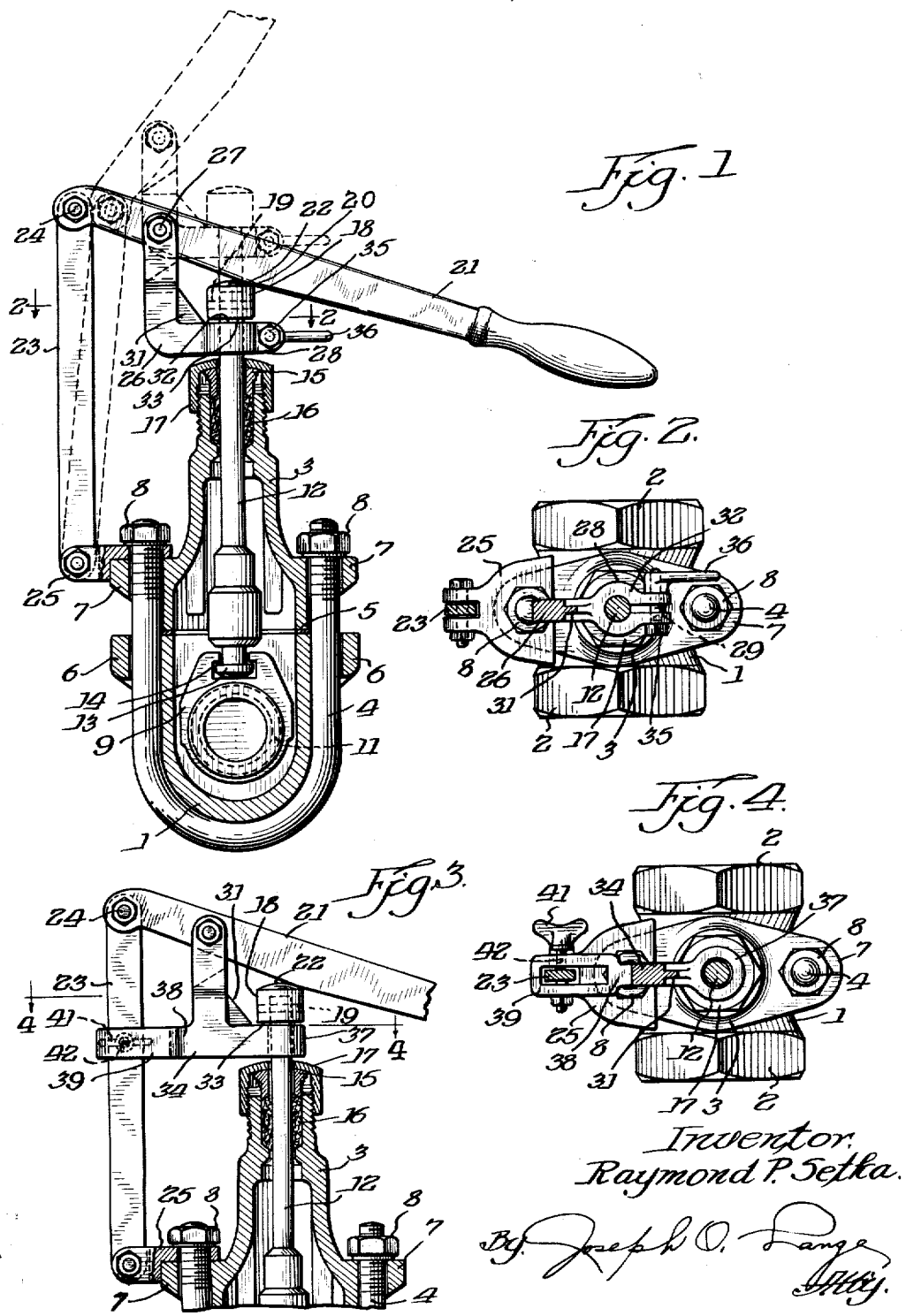

2,885,174

VALVE ACTUATING MECHANISM OR THE LIKE

Raymond P. Setka, Chicago, Ill., assignor to Crane Co., Chicago, Ill., a corporation of Illinois Application December 2, 1953, Serial No. 395,716

4 Claims. (Cl. 251—76)

The present invention pertains to valves, and, more particularly relates to an improved quick-opening valve structure providing for efficient opening and closing of such valves with a minimum amount of time and effort.

In explanation of the background of this invention, it should be understood at the outset that heretofore in valves of this type, many difficulties were experienced in the course of operation. This fact is particularly true where the closure member comprised a wedge disc. Utilizing such a disc, the temperature of the fluids in the line frequently effected a thermal expansion of the disc or closure member in the seated position tightly wedging the disc between the opposed seating surfaces within the valve casing or body. The force needed to extract the disc from the static wedged position was ofttimes beyond the strength of the operator. This fact resulted in the operator delivering a series of blows to the valve which were damaging to the entire valve structure. A second common complaint frequently voiced by users of the valve type concerned, related to the deposition of scale and sediment about the closure member when the latter member is in the seated position for extended periods of time. These encrustations of foreign material thus hardened and cemented the closure member to the seating surfaces. Once more, great difficulty was experienced in opening this valve with similar deleterious consequences in operation resulting therefrom. The above-mentioned difficulties become doubly serious when it is remembered that quick-opening valves are commonly employed where rapid opening or closing is essential for the preservation or insurance of safe operating conditions within the pipe line.

It is a main object, therefore, of my invention to provide a valve structure which will facilitate the extraction of a wedged closure member from the seated position by enabling a series of hammer-like blows of substantial magnitude to be applied to the stem end portion of the valve in the direction of desired movement without damaging the valve structure.

It is a further object of my invention to facilitate the ease of valve opening by providing a novel lever and link assembly in conjunction with the usual valve body which will afford the valve operator a mechanical advantage in opening the valve which exceeds the mechanical advantage available in closing the valve.

These and other objects will become more manifest upon proceeding with the following detailed description read in the light of the accompanying drawings, in which Fig. 1 is a sectional assembly view of a quick-opening gate valve utilizing my invention.

Fig. 2 is a view taken on line 2—2 of Fig. 1.

Fig. 3 is a fragmentary view of a valve employing an optional locking mechanism.

Fig. 4 is a view taken on lines 4—4 of Fig. 3.

Similar reference numerals refer to similar parts throughout the several views.

Referring now particularly to Fig. 1, a quick-opening wedge disc gate valve, such as the No. 494 listed in Crane Co. catalog, page 75, is depicted utilizing my invention. The usual body or casing 1 has end portions 2 which may be threaded for insertion in a pipe line; it is, of course, obvious that flange ends and other equivalent means may be adapted for pipeline connection which will work to similar advantage. A bonnet 3 is firmly affixed to the casing 1, in leakproof relation, with the gasket 5 interposed therebetween, by means of the U-clamp 4. The casing 1 is appropriately flanged and apertured at 6, and the bonnet 3 is similarly flanged and apertured at 7 so that clamp 4 may be secured to the two named valve members and thus maintain them in alignment. Clamp nuts 8 are threadedly engaged to the end limits of the clamp 4 to maintain the desired load. A wedge disc 9 is illustrated in fluid sealing engagement with seat rings 11. A reciprocally and slidably movable threadless stem 12 has a stem head 13 at its lower end limit for engaging recess 14 of wedge disc 9. A stuffing box renders the bonnet member stem opening fluid tight, and comprises the usual gland 15 and packing 16 which is maintained compact by the compressive action of the packing nut 17 which is threadedly engaged to the upper end limit of the bonnet member 3. A hammer block member 18 is attached to the upper extremity of the threadless stem 12 by means of the pin 19 as shown or other suitable means. The hammer block is preferably of a hard and durable material capable of sustaining sharp impact without appreciable deformation or fractures occurring. A lever arm 21 constitutes the means for transmitting the desired opening and closing forces to the hammer block 18. It will be appreciated that the valve closing force is applied directly to the hammer block 18 by means of the lever arm abutting portion 20. The latter portion strikes the top surface 22 of the hammer block in generating its downward arcuate movement about the point of connection between the end limits of the lever arm 21 and the pivot link 23. The latter two members are maintained in pivotable engagement by means of the link bolt 24 which serves as the lever arm fulcrum. Pivot link 23 is maintained in similar pivotable relationship with the link block 25 which is firmly secured to the bonnet member 3 by means of a clamp nut 8. It is, of course, obvious that link block 25 may be suitably attached to the valve casing, if desired.

Particular attention is now directed to the lifting link 26 of Fig. 1 which is of substantially L-shaped configuration. One end limit of the link is pivotally attached to the lever arm 21 by means of the bolt 27. The opposite end limit of the link 26 is slidably engaged to threadless stem 12 by means of the split collar portion 28 formed integral with link 26. Preferably, a strengthening rib or web 31 joins the two leg portions of the link in the manner shown.

As will be seen more clearly in Fig. 2, the split portions of the collar 28 are apertured at 29 for engaging bolt 35. Handle nut 36 is threadedly engaged to the end limit of bolt 35. Upon tightening the two halves of the split collar 28, a frictional engagement is effected with threadless stem 12 preventing relative movement between stem and collar. Thus, all movement of the lever arm 21 and link members 23 and 26 is prevented at connecting pivot points effecting a rigid structure. Axial movement of the threadless stem being prevented, a definite positioning of the disc 9 relative to the seat rings 11 is maintained.

As to a modified form, Figs. 3 and 4 illustrate an optional locking device in which a lifting link 34 having a T configuration employs an extension arm 38 which engages pivot link 23 by means of the integrally formed collar portion 39. Collar portion 39 is threadedly apertured at 42 for engaging wing screw 41 which frictionally engages pivot link 23 and prevents relative movement between link and stem and concomitantly maintains the lever arm 21 and links 23 and 26 in a rigid position. The slidable engagement between link 34 and stem 12 is maintained by collar portion 37 of link 34 which is formed integral therewith.

The two locking mechanisms illustrated prevent the weight of the lever arm from forcing the threadless stem 12 down when in the open position, and also prevent the line fluid pressures from lifting the closure member from the seat when the valve is closed.

It will be noted that the top annular surface 32 of the lifting link collar 28 is the abutting means contacting the lower surface 33 of the hammer block 18 when the lever arm 21 is moved upwardly to effect a valve opening, as depicted in the dotted line portion in Fig. 1. Furthermore, as will again be noted in Fig. 1, when the disc 9 is fully seated an interval remains between the top surface 32 of the lifting link collar 28 and the bottom surface 33 of the hammer block 18. This space or interval allows momentum to be gathered by the collar surface 32 before striking hammer block surface 33 when an upward force is applied to the lever arm 21. It will, in addition, be noted that the pivot connection positioning of the lifting link 26 on the lever arm 21 at bolt 27 is approximately twice as close to the lever arm fulcrum (the pivotable connection between the lever arm and pivot link by link bolt 24) as the point of lever arm contact with hammer block 18. Consequently, it is apparent that a force applied to the lever arm tending to raise the closure member is twice as effective as the same force applied in a downwardly direction tending to seat the closure member by virtue of the doubly effective lever advantage.

It is, of course obvious that although a valve structure effecting a mechanical advantage which is twice as great in opening the valve as in closing the valve is depicted, the mechanical advantage ratio may be increased or lessened as desired within reasonable limits.

To increase the ratio the lever arm-lifting link pivot point, bolt 27, is positioned closer to the fulcrum point, bolt 24. Conversely, to decrease the mechanical advantage ratio a lifting link is installed having the pivotal engagement with the lever arm affixed closer to the lever arm point of contact with the hammer block 18. As the pivot bolt 27 approaches the point on the lever arm abutting the hammer block 18, the ratio between the mechanical advantages in opening and closing the valve approaches unity.

It is readily appreciated that the mechanical advantage afforded the valve operator in raising the closure member is increasingly beneficial as the size of the valves increases. Whereas the weight of the stem and closure member assist by their own mass in the closing of the valve, this same mass must be raised from the seated position in opening the valve. Consequently, the advantage offered by the link positioning on the lever arm is even more desirable in valves of large size.

Furthermore, as previously mentioned, one of the main difficulties in valves of the type concerned is the inability or difficulty experienced in extracting or raising a stuck closure member. My invention provides a two-fold solution in the valve structures described. The distance between the collar surface 32 and hammer block surface 33 allows momentum to be gathered by the collar 28 before the abutting action or hammering action of the two surfaces is effected. The momentum able to be gathered by the collar 28 increases as the disc rises enabling the hammer blows to become increasingly powerful. Similarly, when the valve is in the open position and difficulty is experienced in closing the valve because of sticking or freezing, the loose nature of the pivot connection by bolt 27 enables the lever arm to deliver short hammer blows to the top surface 22 of the hammer block 18. The ability of the disc 9 to be seated by a succession of hammer blows is useful in breaking up any accumulated deposits which may have formed on the seating surfaces or in the casing recess 34. Once broken, these deposits may be easily removed by the fluid flowing through the valve passage and an efficient fluid seal may be effected.

Thus, it is apparent that in a simple valve construction an improvement has been provided enabling the wedge disc 9 to be advanced and withdrawn from the seating surfaces in an efficient manner. These valve opening and closing operations are effected without any undue or damaging stress being placed on any valve component.

While my invention is illustrated as being embodied in a gate valve construction, it will be readily apparent that my novel features of the offset lifting link and hammer blow effect during open and closing operations may be utilized in any valve construction employing a reciprocally movable threadless stem.

In addition to applications of my invention in other valve types, it is obvious that many other changes and modifications may be made in details of construction without departing from the spirit of my invention as determined by the appended claims.

I claim:

1. In a valve substantially as described, the combination comprising a valve casing with a flow passage therethrough, a bonnet therefor, a closure member in the casing, a reciprocally movable stem mounted in a vertical plane and attached to said closure member with the upper end portion extending to the exterior of the valve casing, a hammer block member attached to the upper end limit of said stem, a pivot link mounted on a side portion of said valve casing, a lever arm pivotally engaging an end of said pivot link, impacting means comprising an annular member of substantially L-shaped configuration with one end portion thereof abutting the lower surface of said hammer block member in the course of opening said valve, said impacting means being slidably engageable with said stem, said latter means at the other end portion thereof also pivotally engaging said lever arm directly, said hammer block member being positioned between a lower surface of the said lever arm and an upper surface of the said angular member, said lever arm being pivotally movable in the course of opening said valve whereby a plurality of hammer-like impacts may be delivered to the lower surface of said hammer block member by said impacting means.

2. In a valve substantially as described, the combination comprising a valve casing with a flow passage therethrough, a closure member therefor, a slidable stem connected to said closure member mounted in a vertical plane and extending to the exterior of the casing, a pivot link mounted on said valve casing, a lever arm pivotally engaged to said pivot link, a hammer block member connected to an upper portion of the said stem, a lifting link of substantially inverted T-shaped configuration cooperating with said hammer block member and pivotally connected to said lever arm at an end portion thereof, said lifting link having a collar portion formed integral therewith at a second lifting link end portion, said collar portion slidably engaging said slidable stem and capable of abutting the undersurface of the hammer block member during opening movement of the lever, said lifting link having a second collar portion formed integral with a third end portion, said second collar portion slidably engaging said pivot link and having means for predeterminately inhibiting said latter slidable engagement.

3. In a valve, an actuating structure therefor substantially as described, the combination comprising a valve casing, a bonnet therefor, a closure member within the said casing, a reciprocally movable threadless stem mounted in a vertical plane and extending through said bonnet, said threadless stem having a hammer block member attached to the upper end limit thereof, a lifting link member of angular form having a collar portion formed integral with one end limit thereof, said collar portion slidably cooperating with said threadless stem and having means thereon to inhibit predeterminately said slidable cooperation with the stem, a pivot link supported by the valve casing, a pivotal lever arm fulcrumed on said pivot link, the said lifting link at an upper limit thereof being pivotally attached to the lever arm, said pivotal lever arm including abutting means contacting said hammer block member upon the occurrence of a downward movement of said lever arm whereby an axial movement in a valve closing direction may be imparted to said hammer block member on said stem.

4. In a valve, actuating means therefor substantially as described, the combination comprising a casing, a bonnet therefor, a closure member within the said casing, a reciprocally movable slidable stem mounted in a vertical plane and extending through the said bonnet, a hammer block member affixed to the upper end limit of said threadless stem, a pivot link mounted on said valve casing, a lever arm fulcrumed on said pivot link, said lever arm including abutting means contacting the upper surface of said hammer block member in the course of its pivotal movement for effecting valve closing, a lifting link of angular form pivotally engaged at one end limit to said lever arm, said lifting link having a collar portion at a lower end portion thereof formed integral therewith, said collar portion being slidably engaged to said stem, said collar portion including an upper abutting surface contacting the lower surface of said hammer block member in the course of a pivotal movement of said lever arm effecting valve opening, said lifting link in pivotable engagement with said lever arm being positioned between said lever arm abutting means and said lever arm fulcrum, the force applied to said lever arm having a greater mechanical advantage in effecting valve opening than an equal force applied to said lever arm has in effecting valve closing.

References Cited in the file of this patent

UNITED STATES PATENTS

| | | |
|---|---|---|
| 578,506 | Blessing | Mar. 9, 1897 |
| 1,175,695 | Brand | Mar. 14, 1916 |
| 1,233,659 | Fox | July 17, 1917 |
| 1,770,913 | Kermor | July 22, 1930 |
| 1,877,589 | Reed | Sept. 13, 1932 |